(12) United States Patent
Chedid et al.

(10) Patent No.: US 8,536,376 B2
(45) Date of Patent: Sep. 17, 2013

(54) METHOD FOR REMOVING HALOGEN FROM LIQUID AMMONIA

(75) Inventors: Roland Bou Chedid, Mannheim (DE); Gabriele Iffland, Heidelberg (DE); Jürgen Ciprian, Ludwigshafen (DE); Johann-Peter Melder, Böhl-Iggelheim (DE); Frank-Friedrich Pape, Kleinniedesheim (DE)

(73) Assignee: BASF SE, Ludwigshafen (DE)

( * ) Notice: Subject to any disclaimer, the term of this patent is extended or adjusted under 35 U.S.C. 154(b) by 294 days.

(21) Appl. No.: 12/936,375

(22) PCT Filed: Mar. 26, 2009

(86) PCT No.: PCT/EP2009/053568
§ 371 (c)(1),
(2), (4) Date: Oct. 4, 2010

(87) PCT Pub. No.: WO2009/121782
PCT Pub. Date: Oct. 8, 2009

(65) Prior Publication Data
US 2011/0033361 A1 Feb. 10, 2011

(30) Foreign Application Priority Data
Apr. 4, 2008 (EP) .................................. 08154079

(51) Int. Cl.
*C01C 1/02* (2006.01)
*C07C 211/00* (2006.01)

(52) U.S. Cl.
USPC ............................................. 564/1; 423/352

(58) Field of Classification Search
USPC ...................... 210/683; 423/352, 413; 564/1
See application file for complete search history.

(56) References Cited

U.S. PATENT DOCUMENTS

| 5,496,778 A * | 3/1996 | Hoffman et al. ............. 29/25.01 |
| 6,001,223 A * | 12/1999 | Hoffman et al. ................. 203/12 |
| 6,749,819 B2 | 6/2004 | Otsuka et al. |
| 6,969,466 B1 * | 11/2005 | Starner ......................... 210/663 |
| 2004/0091413 A1 | 5/2004 | Otsuka et al. |
| 2005/0159624 A1* | 7/2005 | Goeboeloes et al. ......... 564/415 |

FOREIGN PATENT DOCUMENTS

| GB | 862180 A | 3/1961 |
| GB | 862181 A | 3/1961 |
| JP | 2002-037623 A | 2/2002 |
| KR | 2002-0078608 A | 10/2002 |
| RU | 2 245 327 C2 | 1/2005 |

OTHER PUBLICATIONS

Phipps et al, Ion Exchange Processes in Liquid Ammonia, Dec. 1967, Analytical Chemistry, vol. 39, No. 14, pp. 1755-1762.*
Phipps, Alan M.; Hume, David N., "Ion exchange processes in liquid ammonia", Analytical Chemistry, vol. 39, No. 14, Dec. 1967, 1755-62.*
Streat, M., "General Ion Exchange Technology," Ion Exchange, ISBN: 3110103419, pp. 686-715.
"Ammonia," Kirk-Othmer Encyclopedia of Chemical Technology, vol. 2, pp. 678-710.
Sybron Chemical Inc., "IONAC ASB-1: Strong Base Type 1 Anion Exchange Resin," XP002585827.
Max Appl, "Ammonia," 2006, pp. 1-155, Wiley-VCH Verlag GmbH & Co KGaA, Weinheim.
de Dardel, F., et al., "Ion Exchangers," 2005, pp. 1-74, Wiley-VCH Verlag GmbH & Co. KGaA, Weinheim.

* cited by examiner

*Primary Examiner* — Wayne Langel
(74) *Attorney, Agent, or Firm* — Novak Druce Connolly Bove + Quigg LLP

(57) ABSTRACT

A method for depleting halide ions from liquid ammonia, which comprises bringing the liquid ammonia into contact with a strongly basic ion exchanger, where the basic structure of the strongly basic ion exchanger is a covalently crosslinked polymer matrix and the content of ammonia in the liquid ammonia is more than 98% by weight.

20 Claims, No Drawings

METHOD FOR REMOVING HALOGEN FROM LIQUID AMMONIA

CROSS-REFERENCE TO RELATED APPLICATIONS

This application is a national stage application (under 35 U.S.C. §371) of PCT/EP2009/053568, filed Mar. 26, 2009, which claims benefit of European application 08154079.1, filed Apr. 4, 2008, the contents of each of which are incorporated herein by reference in their entireties.

FIELD OF THE INVENTION

The present invention relates to a method for depleting halide ions from liquid ammonia. Furthermore, the present invention relates to the use of an ammonia obtainable according to the invention as starting material in the production of amines.

BACKGROUND OF THE INVENTION

General methods for the production of ammonia are described, for example, in Kirk-Othmer (Kirk-Othmer Encyclopedia of Chemical Technology, electronic edition, last updated Feb. 1, 2008, John Wiley and Sons, Inc., chapter "Ammonia") and Ullmann's Encyclopedia of Industrial Chemistry (Ullmann's Encyclopedia of Industrial Chemistry, electronic edition, last updated Feb. 1, 2008, Wiley & Sons, Inc., chapter "Ammonia"). Ammonia is usually produced from synthesis gas and nitrogen. The carbon monoxide (CO) present in the synthesis gas is usually converted to carbon dioxide ($CO_2$) before the actual synthesis in a carbon monoxide shift-reaction, it being possible for the most part to separate off said carbon dioxide easily from the hydrogen gas. The removal of residual $CO_2$ generally takes place by gas washing with a solvent which has a high $CO_2$ solubility. This is generally followed also by a methanization, in which CO is converted to methane. Following the conversion of hydrogen and nitrogen to ammonia, the product gas stream comprises, inter alia, traces of methane and inert gases, such as argon or helium. These compounds are generally removed by purging. Subsequently, ammonia is generally condensed out of the gas stream or isolated by gas washing with water as solvent in the form of an aqueous ammonia solution. Liquid ammonia obtained through condensation is generally commercially available in a purity of 99.9% by weight (remainder water and inert gases).

Usually, a further purification of liquid ammonia takes place by converting the ammonia to the gaseous state and either separating off other impurities by distillation, or the impurities are removed by bringing the gaseous ammonia into contact with absorbents, or are catalytically decomposed by bringing said ammonia into contact with a catalyst.

JP-A-2002037623 and US-A-20040091413 disclose, for example, methods for removing oxygen, carbon monoxide and water from commercially available ammonia by bringing gaseous ammonia into contact with catalysts containing manganese oxide and subsequently passing the gaseous ammonia over zeolites. The removal of halide ions is not disclosed.

In KR-A-20020078608, ammonia gas is passed over a thermally treated zeolite in order to remove traces of water and oil, which leads to undesired by-products during the subsequent conversion of ammonia to $NF_3$. The removal of halide ions is likewise not mentioned.

The methods described in the prior art for purifying ammonia have the disadvantage that ammonia has to be converted to the gaseous state and then condensed again. This process is energetically unfavorable and the industrial conversion generally requires high investment.

It was therefore an object of the present invention to provide a method with which halide ions can be removed from liquid ammonia without the ammonia having to be converted to the gaseous state. A purification method of this type is particularly advantageous if, during the storage or the transportation of liquid ammonia, impurities are passed into the ammonia and have to be removed prior to using the ammonia as starting material in a synthesis.

GB-A-862,180 discloses the removal of ionic impurities, for example chloride, from nonaqueous solvents, including ammonia. This disclosure teaches the use of insoluble, open-chain, high molecular weight polymers which comprise ion exchanger groups. According to the disclosure, the open-chain architecture of the polymers is said to make the ion exchanger groups bonded to the polymer easier to reach since in conventional ion exchangers in which the ion exchanger groups are embedded in a crosslinked matrix, the ion exchanger groups can only be accessed with difficulty in nonaqueous solvents. One suitable open-chain polymer with ion exchanger groups that is disclosed is dimethylaminoethylcellulose. Modified alpha-cellulose is specified as a particularly suitable open-chain polymer.

GB-A-862,180 teaches that the ionic impurities can be rinsed off from the ion exchanger resin by rinsing with an aqueous or nonaqueous eluent. In GB-A-862,181, however, it is established that special eluents have to be used to detach certain ionic compounds, such as quaternary ammonium groups, from open-chain polymers with cationic ion exchanger groups.

BRIEF SUMMARY OF THE INVENTION

The object of the present invention was also to develop a simple industrial method with which halide ions can be removed from liquid ammonia. That material which is used for depleting the halide ions should have a high capacity for receiving ionic impurities and thus permit long service lives. Additionally, the activity of the material should be able to be restored through simple regeneration or work-up, meaning that no long-winded regeneration steps or work-up steps are required. Instead, it was an object to provide a method which requires low investment costs and is easy to realize on an industrial scale.

According to the invention, the object has been achieved by a method for depleting halide ions from liquid ammonia, which comprises bringing the liquid ammonia into contact with a strongly basic ion exchanger, where the basic structure of the strongly basic ion exchanger is a covalently crosslinked polymer matrix.

DETAILED DESCRIPTION OF THE PREFERRED EMBODIMENTS

The liquid ammonia used in the method can be liquid ammonia which comprises halide ions, such as $Cl^-$, $Br^-$, $F^-$, $I^-$, preferably $Cl^-$ and/or $Br^-$, in particular $Cl^-$. The concentration of halide ions in the liquid ammonia is usually between 1 and 10 000 ppm, preferably between 2 and 1000 ppm, particularly preferably between 5 and 500 ppm, especially preferably between 10 and 200 ppm.

The liquid ammonia used may be conventional commercially available liquid ammonia, for example ammonia with a content of more than 98% by weight of ammonia, preferably more than 99% by weight of ammonia, preferably more than 99.5% by weight, in particular more than 99.8% by weight of ammonia.

According to the invention, strongly basic ion exchangers are used.

Strongly basic anion exchangers are composed of a solid basic structure (matrix) which is anchored with functional groups (ion exchanger groups).

According to the invention, the solid basic structure is a covalently crosslinked polymer matrix.

A covalently crosslinked polymer matrix of this type can be obtained through condensation or polymerization of bifunctional monomers with crosslinker molecules. Thus, for example, a covalently crosslinked polymer matrix is obtainable through condensation of m-phenylenediamine with formaldehyde as crosslinker molecule.

Preferably, a covalently crosslinked polymer matrix is obtained through polymerization of polymerizable monomers with polymerizable crosslinker molecules.

The polymerizable monomers used are preferably styrene and/or acrylic acid esters or methacrylic acid esters, particularly preferably styrene.

The polymerizable crosslinker molecules used are, for example, divinylbenzene, diesters of acrylic acid, such as ethylene glycol acrylate, diethylene glycol acrylate, butanediol acrylate, or vinyl esters of acrylic acid. Preference is given to using divinylbenzene as polymerizable crosslinker molecule.

In one particular embodiment, strongly basic ion exchangers are used whose polymer matrix is composed of crosslinked polystyrene or polyacrylate.

The basic structure of strongly basic ion exchangers is anchored with functional groups which have a strongly basic character. Preferred functional groups are quaternary ammonium groups. Examples of quaternary ammonium groups are benzyltrimethyl-ammonium or benzyldimethylethanolammonium groups.

Strongly basic ion exchangers with quaternary ammonium groups are usually obtainable through polymerization of styrene and divinylbenzene and subsequent chloromethylation and subsequent reaction of the chloromethylated reaction products with tertiary amines, such as trimethylamine, triethylamine or dimethylaminoethanol.

Strongly basic ion exchangers are preferably prepared by suspension polymerization.

During the suspension polymerization, the monomers are usually dispersed in the form of droplets in the aqueous phase and generally cured using a free-radical former dissolved in the monomers by increasing the temperature or through irradiation.

On account of their preparation, strongly basic ion exchangers usually have a particle size in the range from 0.01 mm to 100 mm, preferably 0.1 mm to 10 mm, particularly preferably 0.2 to 5 mm.

Examples of commercially available strongly basic ion exchangers are Ambersep© 900 OH, Amberjet© 4200 CI, Amberjet© 4400 CI, Amberjet© 4600 CI, Ambersep© 900 SO$_4$, Amberlite© IRA 402 CI, Amberlite© IRA 404 CI, Amberlite© IRA 410 CI, Amberlite© IRA 458 CI, Amberlite© IRA 458 RF, Amberlite© IRA 478 RF, Amberlite© IRA 900 CI, Amberlite© IRA 900 RF, Amberlite© IRA 910 CI, Amberlite© IRA 958 CI or Imac© HP555. Preferred strongly basic ion exchangers are Ambersep© 900 OH, Amberjet© 4400 CI (in OH form) and Amberlite© IRA 900 CI (in OH form).

The liquid ammonia is brought into contact with the basic ion exchanger under pressure and temperature conditions under which the ammonia is present in the liquid form. Preference is given to choosing a temperature range of from −20 to 60° C., preferably −10 to 40° C. and particularly preferably 0 to 30° C.

The pressure is usually in the range from 1 to 25 bar, preferably in the range from 1 to 20 bar and particularly preferably in the range from 5 to 15 bar.

The liquid ammonia can be brought into contact with the basic ion exchanger in various ways.

A preferred embodiment for depleting halide ions consists in the ion exchanger being packed in beds and liquid ammonia being passed over the ion exchanger packed as a fixed bed, moving bed, fluidized bed or suspension bed.

Preferably, the ion exchangers are packed as a fixed bed.

The various options for configuring this method can be found; inter alis, in Konrad Dorfner, "Ion Exchangers", Walter de Guyter-Verlag, Berlin, 1991, or Ullmann's Encyclopedia of Industrial Chemistry, electronic edition, last updated Jan. 23, 2008, John Wiley & Sons, Inc., chapter "Ion Exchangers", pages 41 to 52.

The flow rate of the liquid ammonia over the ion exchanger packed as a bed is generally in the range from 5 to 200 ($m^3$ of ammonia)/($m^3$ of ion exchanger)/hour, preferably 10 to 120 ($m^3$ of ammonia)/($m^3$ of ion exchanger)/hour and particularly preferably 30 to 100 ($m^3$ of ammonia)/($m^3$ of ion exchanger)/hour.

A further embodiment of the method according to the invention consists in bringing the ion exchanger into contact with the liquid ammonia with stirring and, after a stirring time of from a few minutes to several hours, separating it off from the liquid ammonia.

The stirring time is generally in the range from 1 minute to 48 hours, preferably 5 minutes to 24 hours and particularly preferably 1 hour to 36 hours.

The concentration of the ion exchanger in the liquid ammonia is generally in the range from 10 to 60% by weight, preferably in the range from 20 to 40% by weight and particularly preferably in the range from 25 to 30% by weight.

The ion exchanger is generally separated off from the liquid ammonia by filtration or centrifugation.

With ion exchangers there is generally a loss in activity (deactivation) with increasing use time, which usually becomes evident from the fact that the concentration of halide ions in the liquid ammonia after it has been brought into contact with the deactivated or partially deactivated ion exchanger is no longer as low as for liquid ammonia which has been brought into contact with fresh or non-activated ion exchanger.

The activity of the ion exchanger can usually be restored by regeneration.

Strongly basic ion exchangers are usually regenerated through treatment with aqueous hydroxide solution, preferably aqueous alkali metal hydroxide solution, in particular NaOH or KOH.

The ammonia obtainable by the method according to the invention generally obtains fewer than 500 ppm of halide ions, preferably fewer than 100 ppm of halide ions, particularly preferably fewer than 10 ppm of halide ions. The ammonia obtainable according to the invention can be used as starting material in the organic synthesis. Preferably, the ammonia obtained according to the invention is used in a large-scale industrial process for the production of amines. Particularly preferably, the ammonia according to the invention obtained is used for the production of ethyleneamine.

As a result of the depletion of the halide ions, undesired by-products as a result of a secondary reaction and subsequent reaction during the subsequent conversion of the liquid ammonia are usually reduced. Likewise, the corrosion of plant parts can be reduced as a result of the depletion of halide ions.

The invention will be illustrated in more detail using the examples below.

EXPERIMENTS

Example 1

15 mg of ammonium chloride (powder) were initially introduced in the first autoclave. The autoclave was then closed and 100 g of ammonia were injected in at a pressure of about 10 bar. The mixture was then stirred at room temperature for one hour and a sample (about 10 g) was taken. The concentration of the chloride ions in the ammonia was determined by means of ion chromatography (IC).

The concentration of chloride ions in the liquid ammonia was 100 ppm.

The remaining liquid ammonia (about 90 g) was then transferred from the first autoclave to a second autoclave in which about 3 g of ion exchanger of the type Ambersep© 900 CI (in OH form) was integrated in a catalyst cage. After stirring for 24 hours at room temperature and at a pressure of 10 bar, a further sample (about 10 g) was taken. The chloride content was determined by means of ion chromatography. The content of chloride ions determined in this way was 5 ppm. The chloride content was reduced by 95% as a result of contacting with the strongly basic ion exchanger according to the invention.

Example 2

15 mg of ammonium chloride (powder) were initially introduced in the first autoclave. The autoclave was then closed and 100 g of ammonia were injected in at a pressure of about 10 bar. The mixture was then stirred at room temperature for one hour and a sample (about 10 g) was taken. The concentration of the chloride ions in the ammonia was determined by means of ion chromatography.

The concentration of chloride ions was 93 ppm.

The remaining liquid ammonia (about 90 g) was then transferred from the first autoclave to a second autoclave in which about 5 g of ion exchanger of the type Ambersep© 4400 CI (in OH form) was integrated in a catalyst cage. After stirring in each case for 3 hours and 24 hours at room temperature and at a pressure of 10 bar, a further sample (in each case about 10 g) was taken in each case. The chloride content was determined by means of ion chromatography. The content of chloride ions determined in this way was 18 ppm after 3 hours and 2 ppm after 24 hours. The chloride content was reduced by 82% after 3 hours and by 98% after 24 hours as a result of contacting with the strongly basic ion exchanger according to the invention.

The invention claimed is:

1. A method for depleting halide ions from liquid ammonia, which comprises bringing the liquid ammonia into contact with a strongly basic ion exchanger at a temperature in a range from $-10°$ C. to $60°$ C., where the basic structure of the strongly basic ion exchanger is a covalently crosslinked polymer matrix, the content of ammonia in the liquid ammonia is more than 98% by weight, and the basic ion exchanger is in an OH form.

2. The method of claim 1, wherein the polymer matrix of the strongly basic ion exchanger is composed of crosslinked polystyrene or polyacrylate.

3. The method of claim 1, wherein the strongly basic ion exchanger comprises quaternary ammonium groups as functional groups.

4. The method of claim 1, wherein the liquid ammonia is brought into contact by passing the liquid ammonia over the ion exchanger, where the ion exchanger is arranged packed in beds.

5. The method of claim 4, wherein the ion exchanger is arranged as a fixed bed.

6. The method of claim 4, wherein the flow rate of the liquid ammonia is 10 to 120 ($m^3$ of ammonia)/($m^3$ of ion exchanger)/hour.

7. The method of claim 1, wherein the liquid ammonia is brought into contact with the ion exchanger by stirring.

8. The method of claim 7, wherein the ion exchanger is stirred together with the liquid ammonia for between 1 hour and 36 hours.

9. The method of claim 1, wherein the liquid ammonia and ion exchanger are brought into contact at a temperature in the range from $-10$ to $40°$ C.

10. The method of claim 1, wherein liquid ammonia and ion exchanger are brought into contact at a pressure in the range from 1 to 20 bar.

11. The method of claim 1, wherein the ion exchanger is regenerated.

12. The method of claim 1, wherein the content of halide ions in the liquid ammonia is in the range from 10 ppm to 200 ppm.

13. The method of claim 1, wherein the halide ion is chloride.

14. The method of claim 1, wherein the liquid ammonia and ion exchanger are brought into contact at a pressure in the range from 1 to 25 bar.

15. A method for the production of amines, where ammonia is used as starting material, wherein the ammonia used in the method is purified in accordance with the method of claim 1.

16. A method for the production of amines, wherein, in a first stage, liquid ammonia is purified according to claim 1 and, in a second stage, the ammonia obtained in the first stage is used in a method for the production of amines.

17. The method of claim 1, wherein the liquid ammonia and ion exchanger are brought into contact at a temperature in a range from $0°$ C. to $30°$ C.

18. The method of claim 1, wherein the liquid ammonia and ion exchanger are brought into contact at a pressure in a range from 5 bar to 15 bar.

19. A method for depleting halide ions from liquid ammonia, which comprises bringing the liquid ammonia into contact with a strongly basic ion exchanger at a temperature in a range from $-10°$ C. to $60°$ C., where the basic structure of the strongly basic ion exchanger is a covalently crosslinked polymer matrix, and the content of ammonia in the liquid ammonia is more than 98% by weight.

20. A method for depleting halide ions from liquid ammonia, which comprises bringing the liquid ammonia into contact with a strongly basic ion exchanger, where the basic structure of the strongly basic ion exchanger is a covalently crosslinked polymer matrix, the content of ammonia in the liquid ammonia is more than 98% by weight, and the basic ion exchanger is in an OH form.

* * * * *